United States Patent
Nelson

(10) Patent No.: US 6,185,918 B1
(45) Date of Patent: Feb. 13, 2001

(54) FAN HEAD MOBILIZER FOR AIR (LEAF) BLOWERS TO DISPLACE MATTED VEGETATION

(76) Inventor: Dewey Allen Nelson, 206 N. Spring Valley Rd., Wilmington, DE (US) 19807

( * ) Notice: Under 35 U.S.C. 154(b), the term of this patent shall be extended for 0 days.

(21) Appl. No.: 08/937,701

(22) Filed: Sep. 29, 1997

(51) Int. Cl.[7] ........................................ B25F 3/00
(52) U.S. Cl. .................. 56/12.9; 56/289; 56/DIG. 8; 56/DIG. 9; 30/123; 30/903; 15/377
(58) Field of Search .................... 56/12.9, 12.8, 56/289, DIG. 8, DIG. 9; 30/123.3, 123, 308.1, 309; 37/905, 324, 328; 15/405, 377; 172/41, 42, 378

(56) References Cited

U.S. PATENT DOCUMENTS

| | | | |
|---|---|---|---|
| 1,945,810 | * | 2/1934 | Holtz . |
| 1,979,904 | * | 3/1934 | Guedel . |
| 4,070,771 | * | 1/1978 | Yakiwchuk ........................ 15/405 X |
| 4,667,408 | * | 5/1987 | Kirk ..................................... 30/123.3 |
| 5,054,159 | * | 10/1991 | Richardson ............................ 15/400 |
| 5,072,486 | * | 12/1991 | Guarascio ............................. 15/401 |

* cited by examiner

*Primary Examiner*—H. Shackelford

(57) ABSTRACT

This Power air blower fan head mobilizer of matted vegetation solves the problem of blowing leaves and other debris matted together by wind or rain. A flexible serrated mobilizer probe (composed of metal, plastic, or composite) is inserted into the terminal fan head air nozzle of an air or leaf blower in such a way that a mass of often wet debris is stirred, tossed, moved, and cut. Thus, the invention opens pathways into the matted mass so that airflow is effective. The device includes a curved sharp terminus, which acts as a vegetation cutter on both flat and irregular surfaces. Large stemmed vegetation and small limbs can also be sawed in two because the probe has coarse and fine serrations on its respective lateral sides. In addition, the 5 inch projecting curved probe terminus provides a spring skid to reduce weight of the power air blower, thus saving energy of the operator.

18 Claims, 3 Drawing Sheets

FAN HEAD MOBILIZER FOR AIR (LEAF) BLOWERS TO DISPLACE MATTED VEGETATION

BACKGROUND OF THE INVENTION

Figure 1A:
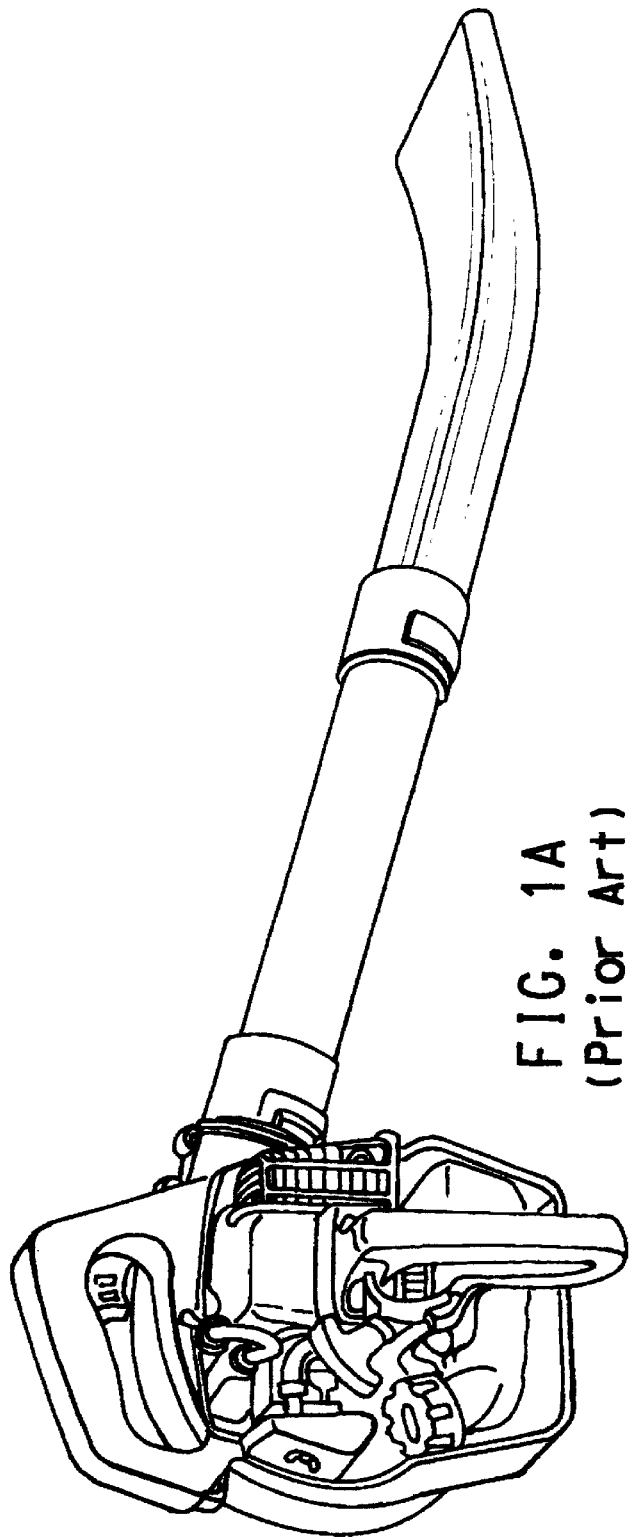

When piles of autumn leaves or wet vegetation debris accumulate, the usual procedure is to begin by raking and collecting them because power air (leaf) blowers cannot usually make inroads into such soggy and heavy masses. This new FAN HEAD MOBILIZER FOR AIR (LEAF) BLOWERS in one operation will stir, cut, toss, and therefore displace wet or matted leaves and vegetation that deflect and defy air currents from present day power air blowers. These cutting, tossing and displacing maneuvers performed by the invention allow air currents to work in the interior of the penetrated and distributed mass so that it can be blown and accumulated in the usual manner. The flexible mobilizer probe of the fan head is the core feature of the new invention. Composed of flexible high carbon steel, carbon fiber composite, or plastic, it is an integral part of the fan head. Said mobilizer has three functions: 1) To (primarily) mobilize masses of vegetation. 2. To (secondarily) act as a weed cutter as the occasion demands. 3) To (secondarily) act as a skid to bear some of the weight of the air blower, therefore lessening the workload of the operator.

Patent searches disclosed the following Design patents that deserve comment: D297,274; D326,458; and D375,822. These patents relate to overall ornamental designs of air tubes, power blowers, and a circular spinning grass trimmer; therefore, they contain no features concerning a fan head air nozzle design for mobilizing matted masses of vegetation, cutting individual heavy weeds, or bearing weight of the air (leaf) blower by the skid feature (vide supra): all three elements being present in this new FAN HEAD MOBILIZER FOR AIR (LEAF) BLOWERS.

BRIEF SUMMARY OF THE INVENTION

Matted leaves, vegetation and various other detritus such as interlocking twigs often interfere with the performance of air and leaf blowers because of the density and weight of an often soggy mass. These problems multiply during autumn rains or during heavy leaf falls resulting from wind storms. Said dense and often wet material can be moved by stirring and agitating it with this invention, thus allowing an accelerated airflow to effectively enter, disperse, and therefore collect and assemble it for disposal in the usual manner.

A flexible stainless steel, carbon fiber composite, or plastic mobilizer probe of high flexibility and tensile strength that projects five inches from the fan head air nozzle will effectively mobilize large masses of matted and wet vegetation using combined airflow and hand levering motions by the operator. Kinetic energy stored in the above described elastic probe enables the operator to toss aside wet vegetation weighing several pounds as well as large twigs and limbs, sending them several feet away if desired. The projecting probe will also cut the stems of large weeds and other vegetation so that they can be blown and accumulated. This is accomplished by fine or gross serrations (saw-teeth) present on the lateral sides of the new mobilizer probe.

The flexible probe terminates in a 30°–40° upward bend (preferably 35°); and this basic core of the invention performs four functions: 1) The curve acts as a cradle to help gather debris and hold it on the probe until it can be tossed aside or stirred to allow air to reach it. 2) The terminal curve is sharpened on its bottom (inferior) surface (i.e. the surface next to the concrete, etc) so that it can thus cut away vegetation caught in cracks and crevices. It is automatically resharpened by sliding it along rough surfaces of concrete, stone, macadam, etc. 3) The terminal curve also acts as a skid to bear part of the weight of the entire power unit, straight pipe, and the terminal fan head air nozzle. 4) The 30°–40° upward bend of the terminus of the flexible probe diverts air upward and forward into the debris for dissection of it to allow effective mobilization.

BRIEF DESCRIPTIONS

Figure 1B:

FIG. 1A is a line drawing of a generic power (leaf) blower. FIG. 1B shows detached (unscrewed) fan head air nozzle with new mobilizer probe demonstrating terminal upward curve of the sharpened terminal tip. Note that FIG. 1 for demonstration purposes only is based on general dimensions of an "ECHO PB-1000" power blower; however, the new fan head air nozzle can be produced to fit other types of power (leaf) blowers. The terminal probe protrudes five inches from the fan air nozzle, is centered on it, and is freely mobile up and down (but not sideways). Shown on the terminal probe is a 35° upward curve that is sharpened at the terminus on the bottom (inferior) surface so that it: 1) Acts as a cutter of small vegetation. 2) Accelerates air upward into the matted leaves, etc. 3) Acts as a skid to carry part of the weight of the air/leaf blower to lessen work of the operator.

Figure 2A:
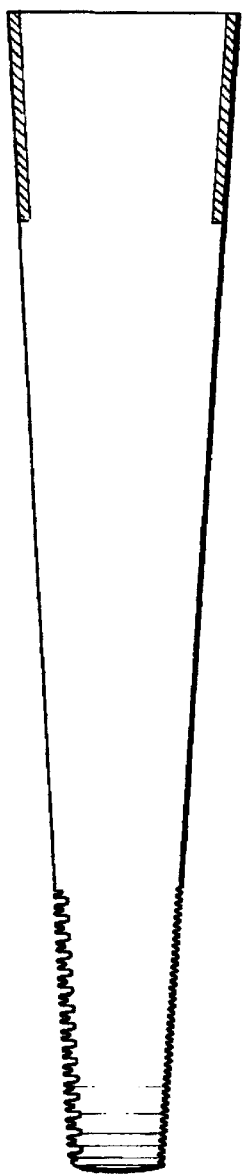
Figure 2B:
Figure 2C:
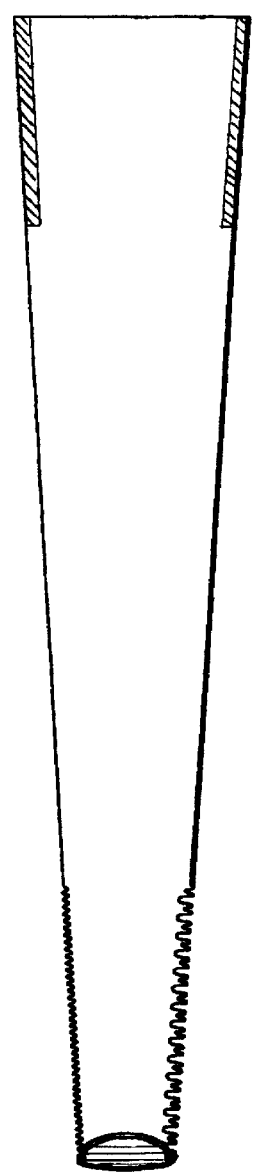

FIGS. 2A, 2B, 2C is a drawing of the flexible probe. FIG. 2A is a bottom view, FIG. 2B is a side (lateral) view, and FIG. 2C is a top (superior) view. Narrow bands of cross-hatching at top of each view indicates point of attachment of probe (by epoxy, plastic molding, or carbon fiber composite) to inside wall of proximal fan head air nozzle. This allows the flexible probe to freely move up and down; however, it is fixated so that it cannot move side-to side. Serrations (saw teeth) of fine and gross type demonstrated in FIGS. 2A, 2C).

Figure 3A:
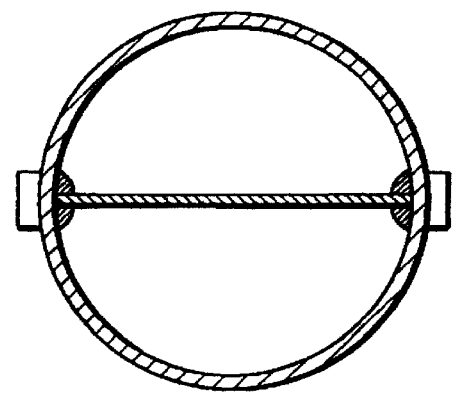
Figure 3B:
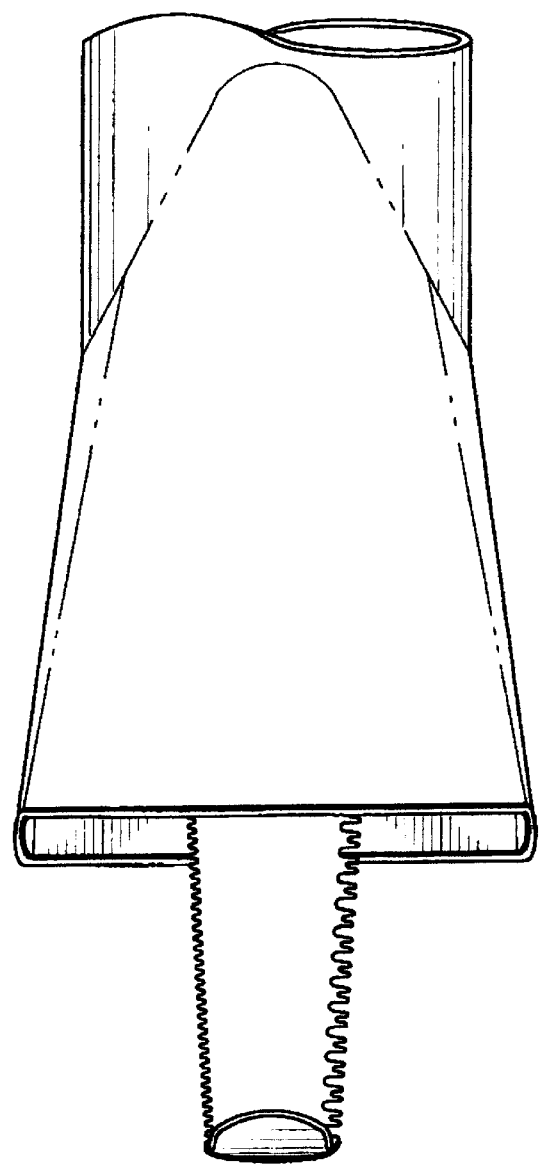

FIGS. 3A & 3B -respectively are drawings of the rear (posterior) view and front (anterior) view. View FIG. 3A illustrates the locus of the proximal end of the flexible stainless steel probe where it is fixated in place by epoxy, or in other models can be composed of plastic or carbon fiber composite. Cross-hatched semicircles in FIG. 3A show areas of attachment of the probe inside the air nozzle opposite the locking mechanism of the fan head air nozzle. FIG. 3B is a front (anterior) view showing the flexible serrated probe with a sharpened upwardly bent terminus.

DETAILED DESCRIPTION OF FAN HEAD MOBILIZER FOR AIR (LEAF) BLOWERS TO DISPLACE MATTED VEGETATION

The invention will mobilize wet leaves, matted vegetation, and interlocking twigs that usually defy airflow emanating from the fan head nozzle of today's electrical and gasoline motorized power blowers. The invention is a new and never heretofore described type fan head nozzle. It is interchangeable with the presently used units so that the original fan head nozzle can at any time be reinserted to be used independently of this new mobilizer (FIG. 1. It is also designed to cut small weeds and bushes out of the way because of the design of the mobilizer's probe containing light serrations (saw-teeth) on one lateral side with more gross serrations being present on the other (FIGS. 2A, 2C, 3B).

The heart of the invention is the new mobilizer probe. This is a tapered flexible metal, carbon fiber composite, or plastic insert 19 inches in width long, measuring 3 inches in width at proximal end and 1½ inches in width at terminus (FIGS. 2A, 2C). This probe is either epoxied in place or unitarily molded into the heavy plastic tubes now in general use to construct the fan head nozzle. If formed of flexible steel, the mobilizer probe is 0.027 inch thick and lies athwart the air current where it is secured in place in the medial proximal fan head nozzle (FIG. 3A). The thin flexible steel mobilizer will not interrupt airflow; rather it is designed to redirect it in a more forceful upward vector because of its terminal bend (FIGS. 1B, 2B, 3B).

This new mobilizer is designed to be manufactured from steel, plastic, or composite carbon fiber of high tensile strength. Thus, it is capable of easily stirring and moving wet matted vegetation weighing 2–3 pounds or more The mobilizer probe can be pushed into or under wet debris and leaves that deflect and defy air blasts from the usual power blower. Said mobilizer probe can also move other types of debris such as criss-crossed twigs by sawing into them, agitating them, or tossing them aside. The upwardly curved terminal tip of the probe can also move individual limbs weighing up to 1 pound because of the high tensile strength of the probe. Leverage power is enhanced by the combined length of the straight pipe (off the power unit), the terminal fan head air nozzle, and the projecting flexible probe mobilizer whose measurements combined are approximately 36 inches (FIG. 1B).

The unit will glide on a relatively smooth surface (driveway or patio), thus saving energy of the operator. An additional use is to cut small weeds and vegetation to avoid bending over to perform this as a separate process. This is accomplished by cutting and sawing motions using either the specially curved sharpened tip of the glide skid (especially useful for cutting small vegetation growing in cracks); or in the case of large weeds, to cut their stems utilizing the gross or fine saw teeth on each side of the mobilizer (FIGS. 2A, 2C, 3B).

In sum, his invention is essentially a new and never previously described fan head air nozzle that was designed to perform a variety of functions (vide supra). If there is a demand for its many labor seving uses, this FAN HEAD MOBILIZER FOR AIR (LEAF) BLOWERS TO DISPLACE MATTED VEGETATION can be provided to consumers to fit the great variety of existent fasteners present on the straight pipe (directly off the motor), presently being produced by many manufacturers (FIG. 1). Thus, it is planned that this invention can be manufactured and provided as an "add-on unit" for presently owned air and leaf blowers, thus contributing environmental and economic savings to consumers.

I claim:

1. An air leaf blower comprising:
    a powered fan unit,
    a straight pipe having a distal end and proximal end that comes directly off the powered fan unit,
    a fan head air nozzle with a proximal and distal end, the proximal end being attached to the distal end of the straight pipe,
    and an attachment for mobilizing matted vegetation connected to the distal end of the fan head air nozzle said attachment having a flexible probe mobilizer having a proximal end, a distal end, and generally flat upper and lower surfaces bounded by lateral edges and being tapered from the proximal end to the distal end, the lateral edges being serrated, and the distal end of the probe mobilizer extending beyond the distal end of the fan head nozzle.

2. An air leaf blower according to claim 1 wherein said probe mobilizer is composed of flexible stainless steel, plastic or carbon fiber composite.

3. An air leaf blower according to claim 1 wherein said probe mobilizer is molded as a single unit with said fan head nozzle.

4. An air leaf blower according to claim 1 wherein the probe mobilizer has a length of about 19 inches, a proximal end width of about 3 inches, a distal end width of about 1½ inches, and a thickness over its entire length of about 0.027 inch.

5. An air leaf blower according to claim 1 wherein the distal end of the probe mobilizer has an upward bend in the range of 30 to 40 degrees.

6. An air leaf blower according to claim 5 wherein the upwardly bent distal end of the probe mobilizer has a sharpened terminal edge.

7. A process for moving, stirring, and agitating matted vegetation such as wet leaves and intertwined twigs, by agitating such vegetation with the air leaf blower of claim 1.

8. A process for moving, stirring, and agitating matted vegetation such as wet leaves and intertwined twigs, by agitating such vegetation with the air leaf blower of claim 2.

9. A process for moving, stirring, and agitating matted vegetation such as wet leaves and intertwined twigs, by agitating such vegetation with the air leaf blower of claim 3.

10. A process for moving, stirring, and agitating matted vegetation such as wet leaves and intertwined twigs, by agitating such vegetation with the air leaf blower of claim 4.

11. A process for moving, stirring, and agitating matted vegetation such as wet leaves and intertwined twigs, by agitating such vegetation with the air leaf blower of claim 5.

12. A process for moving, stirring, and agitating matted vegetation such as wet leaves and intertwined twigs, by agitating such vegetation with the air leaf blower of claim 6.

13. A nozzle assembly for use with an air leaf blower comprising:
    a fan head air nozzle having a proximal end adapted to be attached to a straight pipe of the air leaf blower and a distal end, and
    an attachment for mobilizing matted vegetation connected to the distal end of the fan head air nozzle, said attachment having a flexible probe mobilizer having a proximal end and a distal end, and generally flat upper and lower surfaces bound by lateral edges and being tapered from the proximal end to the distal end, the lateral edges being serrated, and the distal end of the probe mobilizer extending beyond the distal end of the fan head nozzle.

14. A nozzle assembly according to claim 13 wherein said probe mobilizer is composed of flexible stainless steel, plastic or carbon fiber composite.

15. A nozzle assembly according to claim 13 wherein the probe mobilizer is molded as a single unit with said fan head nozzle.

16. A nozzle assembly of claim 13 wherein the probe mobilizer has a length of about 19 inches, a proximal end width of about 3 inches, a distal end width of about 1½ inches, and a thickness over its entire length of about 0.027 inch.

17. A nozzle assembly of claim 13 wherein the distal end of the probe mobilizer has an upward bend in the range of 30 to 40 degrees.

18. A nozzle assembly of claim 17 wherein the upwardly bent distal end of the probe mobilizer has a sharpened terminal edge.

* * * * *